(12) United States Patent
Evans et al.

(10) Patent No.: US 6,282,786 B1
(45) Date of Patent: Sep. 4, 2001

(54) METHOD OF MAKING INJECTION FORMED HYBRID AIRFOIL

(75) Inventors: Charles R. Evans, Cincinnati; Joseph T. Begovich, Jr.; Douglas D. Ward, both of West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/374,532

(22) Filed: Aug. 16, 1999

(51) Int. Cl.⁷ ....................................................... B23P 15/00
(52) U.S. Cl. ................................... 29/889.72; 29/889.721
(58) Field of Search ........................... 29/889.71, 889.72, 29/889.721, 527.3, 527.2; 416/241 A, 230

(56) References Cited

U.S. PATENT DOCUMENTS

| | | |
|---|---|---|
| 3,327,995 | 6/1967 | Blackhurst et al. . |
| 3,796,513 | 3/1974 | Jonas . |
| 4,118,147 | 10/1978 | Ellis . |
| 5,295,789 | 3/1994 | Daguet . |
| 5,634,771 | 6/1997 | Howard et al. . |
| 5,655,883 | 8/1997 | Schilling . |
| 5,791,879 | 8/1998 | Fitzgerald et al. . |
| 5,839,882 | 11/1998 | Finn et al. . |
| 5,875,549 | * 3/1999 | McKinley ............................ 29/889.2 |
| 5,887,332 | * 3/1999 | Champenois et al. .............. 29/527.2 |

* cited by examiner

Primary Examiner—I Cuda Rosenbaum
(74) Attorney, Agent, or Firm—Andrew C. Hess; Gerry S. Gressel

(57) ABSTRACT

A hybrid gas turbine engine airfoil is made by forming a metal airfoil with a pocket in one side thereof. The pocket is covered by a caul. An elastomeric fluid is injected into the pocket and cured therein for bonding thereto. The caul is removed from the airfoil to expose the cured elastomer conforming to the aerodynamic profile thereof.

17 Claims, 3 Drawing Sheets

METHOD OF MAKING INJECTION FORMED HYBRID AIRFOIL

BACKGROUND OF THE INVENTION

The present invention relates generally to gas turbine engines, and, more specifically, to airfoil manufacture therefor.

A turbofan gas turbine engine includes a fan having a row of fan blades extending outwardly from a supporting rotor disk. The fan is powered by a turbine which extracts energy from combustion gases generated in a core engine for producing thrust to power an aircraft in flight.

Minimizing engine weight for an aircraft application is a primary design objective. However, weight reduction is itself limited by the requirement to maintain component strength under the various loads experienced during operation.

For example, the fan blades are relatively large and generate significant centrifugal force during rotor operation. The blades must be designed to withstand both centrifugally induced loads and stress as well as aerodynamic loads as ambient air is pressurized for generating propulsion thrust.

Maximum fan blade size is limited by the high strength materials available for the manufacture thereof, and the associated cost of manufacture. All-metal fan blades, such as titanium, have high strength yet are expensive to manufacture. All-metal fan blades are also relatively heavy which correspondingly increases the size and strength requirements of the supporting dovetails thereof and rotor disk.

Composite fan blades formed of high strength graphite fibers in a carbon matrix enjoy high strength at reduced weight over all-metal fan blades. However, composite fan blades are expensive to manufacture, and must be specifically configured to provide directional strength for enjoying a suitable useful life.

Hybrid fan blades are being developed for reducing weight while providing suitable strength. A typical hybrid blade has a metal body, such as titanium, with weight reducing pockets preferentially formed in one side thereof. The pockets are filled with a suitable elastomer to complete the required aerodynamic contour of the airfoil portion of the blade for acceptable aerodynamic performance. The metal portion of the blade provides the required strength, with metal being removed in the pockets for removing weight without compromising overall strength of the blade.

One manner of making hybrid blades includes machining the desired pockets in the pre-formed or pre-forged airfoil as its contours are machined. Elastomer in the form of a paste or putty is positioned in the respective pockets. And, a pair of contoured forming tools or dies are disposed on opposite sides of the blade for pressing the elastomer in the pockets to undergo curing. However, this manufacturing process is complex and expensive, and is not practical for producing hybrid blades in large quantities.

Accordingly, it is desired to provide an improved method of making hybrid gas turbine engine airfoils at reduced cost.

BRIEF SUMMARY OF THE INVENTION

A hybrid gas turbine engine airfoil is made by forming a metal airfoil with a pocket in one side thereof. The pocket is covered by a caul. An elastomeric fluid is injected into the pocket and cured therein for bonding thereto. The caul is removed from the airfoil to expose the cured elastomer conforming to the aerodynamic profile thereof.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
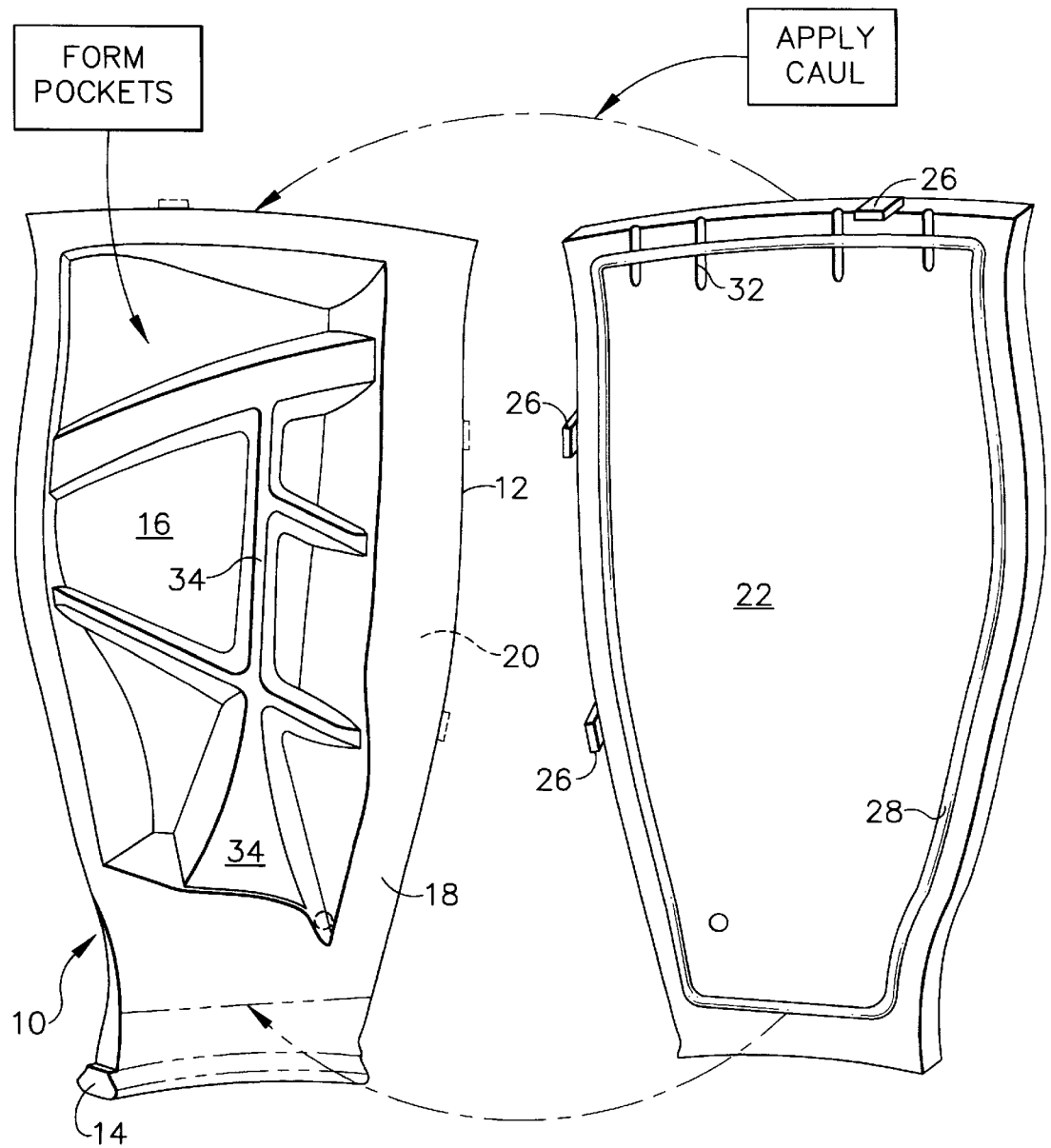
FIG. 1 is an elevational view of a gas turbine engine airfoil and complementary caul used in the manufacture thereof in accordance with an exemplary embodiment of the present invention.

Illustrated in FIG. 1 is an exemplary gas turbine engine fan blade 10 in an intermediate form of manufacture. The blade 10 includes an airfoil 12, and an integral dovetail 14 which may have any conventional profile for use in a turbofan gas turbine engine. The airfoil and dovetail may be initially formed as a unitary forging of a suitable high strength metal, such as titanium.

The metal airfoil 12 has suitably formed therein one or more recesses or pockets 16 extending into a first, or pressure side 18 of the airfoil. Six exemplary pockets 16 are shown in this embodiment and may be conventionally machined in the initially solid airfoil. The opposite, second side 20 of the airfoil is continuous metal and defines an aerodynamically smooth suction side of the airfoil.

The airfoil extends radially along its span from a root near the dovetail to its radially outer tip, and axially between opposite leading and trailing edges in a conventional configuration. The airfoil typically twists around the span axis from its root to tip, and has changing camber therebetween as required for maximizing aerodynamic efficiency.

Accordingly, the airfoil has relatively complex three dimensional (3D) contour which varies from root to tip and between the leading and trailing edges, with the blade first and second sides 18,20 being configured for their pressure and suction side functions.

As shown in FIG. 1, a caul 22 is configured for covering the airfoil first side 18, and thereby cover the several pockets 16. The caul 22 may be formed of a composite material such as carbon fiber in an epoxy matrix for providing sufficient strength and stiffness, with a complementary contour on the inboard surface which engages the airfoil first side 18. Since the airfoil first side 18 has a varying contour from root to tip and between the leading and trailing edges, the caul 22 has a complementary contour to closely match and engage the airfoil first side 18.

Figure 2:
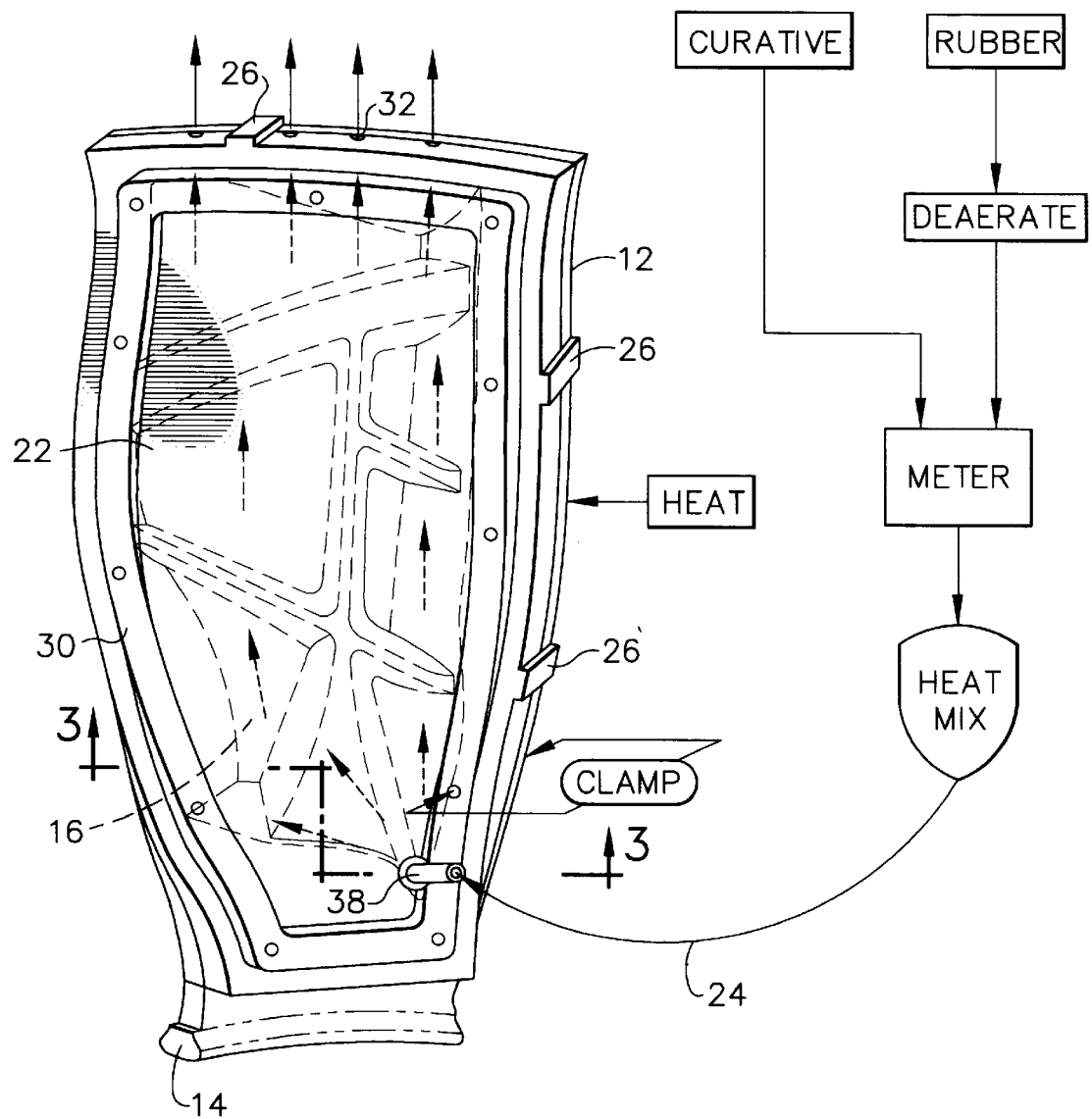
FIG. 2 is a flowchart representation of an exemplary method for making the hybrid airfoil illustrated in FIG. 1 with a cooperating caul.

As shown in FIG. 2, an uncured elastomer 24 in the form of a viscous fluid or liquid is suitably injected into the pockets 16 for filling thereof. In this way, the individual pockets are filled with the elastomeric fluid 24, which may then be suitably cured in the pockets 16 for bonding thereto. The caul 22 may then be removed to expose the so-formed hybrid blade.

In the exemplary embodiment illustrated in FIG. 2, the elastomeric fluid 24 is provided in any conventional manner as specified by the manufacturer for the specific elastomer desired. For example, the elastomer may be in the preferred form of polyurethane rubber which is provided in an initial liquid form which is heated to a suitable temperature and undergoes suitable deaeration, and is mixed with a corresponding curative agent which has been heated to a suitable temperature, in metered portions thereof. The elastomeric fluid and curative are mixed together and then injected into the pockets for curing therein.

The entire hybrid blade and conforming caul 22 are preferably heated to a common temperature prior to injection of the heated elastomeric fluid 24 therein. Upon filling the several pockets of the airfoil, the so filled airfoil is maintained at the common temperature of the blade and caul for initial curing. The blade may then be conventionally post-cured at suitable elevated temperature for completing the curing process as required for the particular elastomeric material used.

Since both the airfoil 12 and the caul 22 have complementary varying 3D contours, the caul is preferably registered or aligned with the airfoil to match the complementary contours thereof. This may be effected by providing registration tabs 26 integrally formed at selected locations around the perimeter of the caul for laterally engaging respective edges of the airfoil, as illustrated for example in FIGS. 2 and 3.

Two of the registration tabs 26 may be spaced apart along the leading edge of the airfoil, with a third registration tab being disposed at the tip of the airfoil near its trailing edge. In this way, the caul may be quickly and accurately applied atop the airfoil by abutting the respective registration tabs along the corresponding edges of the airfoil.

Figure 3:
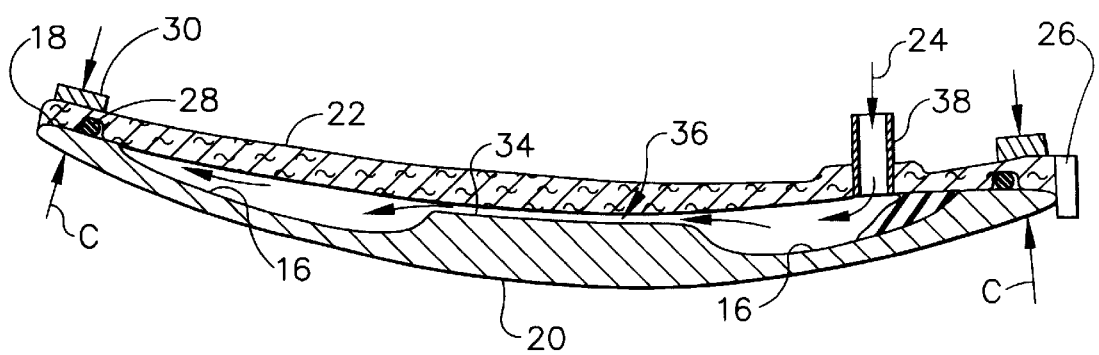
FIG. 3 is a radial sectional view through the airfoil and cooperating caul illustrated in FIG. 2 and taken along line 3—3.

As shown in FIGS. 1 and 3, the caul 22 preferably includes a perimeter seal 28 in the exemplary form of a O-ring mounted in a corresponding recess or seat in the engaging surface of the caul. The seal follows the perimeter of the caul around the one or more pockets being filled with elastomer. In this way, the caul 22 may be sealed to the airfoil first side 18 atop the corresponding pockets 16.

As shown in FIGS. 2 and 3, the caul preferably also includes a perimeter frame 30, which may be a separate component or integrally formed with the caul itself, that provides a locally stiff or rigid region around the caul upon which a plurality of suitable clamps, designated by the letter C, may be applied for clamping the caul to the airfoil around the perimeter thereof. In this way, the caul is clamped to the airfoil, with the seal 28 being clamped to the airfoil first side for maintaining a seal therewith.

The elastomeric fluid 24 may then be injected under suitable pressure into the pockets 16. Since the pockets 16 initially have air therein, the caul 22 is preferably configured for bleeding air from the pockets as the elastomeric fluid displaces the air in the pockets.

This may be effected by providing a plurality of bleed or weep holes 32 in the form of recessed slots at the tip of the caul as illustrated in FIGS. 1 and 2. The bleed holes 32 interrupt the perimeter seal 28 and permit the escape of air as the elastomeric fluid 24 is injected into the pockets.

As indicated above, the airfoil 12 is preferably formed with a plurality of the pockets 16 in the first side thereof. And, the elastomeric fluid 24 is preferably injected in turn into the pockets to ensure escape of all air therein. This may be accomplished with a single injection site, or multiple injection sites.

As shown in FIGS. 1 and 3, the airfoil 12 is preferably formed with recessed lands or ribs 34 between adjacent ones of the pockets 16. The caul 22 is preferably contoured to provide a gap 36 atop the ribs 34. The engaging surface of the caul 32 is therefore configured to define the final profile or surface of the airfoil first side 18 upon final injection of the elastomer. As the elastomeric fluid 24 is injected into the one of the pockets 16 as illustrated in FIG. 3 it is permitted to flow through the several gaps 36 to fill the adjoining pockets in turn. As the pockets are filled, the air contained therein is discharged through the bleed holes 32 as illustrated in FIG. 2 until some of the elastomer fluid itself is bled therethrough upon complete filling of the several pockets.

In the preferred embodiment illustrated in FIG. 2, the elastomeric fluid 24 is injected through the caul 22 at a single site at one end of the caul, and fills all of the pockets 16 in turn. As the fluid travels from pocket to pocket through the respective gaps 36, air is bled from the opposite end of the caul to ensure complete evacuation of air from the several pockets and complete filling thereof with the elastomeric fluid.

As shown in FIGS. 2 and 3, the caul includes an integral inlet tube or port 38 suitably located at one end of one of the pockets 16 to be filled. The inlet tube 38 is suitably joined to the injection apparatus for receiving the elastomeric fluid under suitable pressure.

Since the elastomeric fluid 24 is initially viscous in the exemplary consistency of syrup, sufficient pressure must be provided for injecting the fluid through the caul and from pocket to pocket through the small gaps 36 therebetween. The pressure of the elastomeric fluid is preferably maintained after all the pockets are filled until the fluid is suitably cured to ensure complete filling of the several pockets. The caul 22, itself should therefore have suitable structural rigidity for withstanding the developed pressure during fluid injection without unacceptable distortion of the caul which would increase the profile thickness of the elastomer in the pockets.

In the preferred embodiment, the back pressure exerted by the caul on the fluid being injected is preferably limited to in turn limit distortion of the caul 22 itself. Back pressure reduction may be controlled by using a suitable number of the bleed holes 32 with suitably large flow areas, as well as by providing suitably sized gaps 36 for reducing pressure losses along the flowpath of the fluid being injected through the caul.

Figure 4:
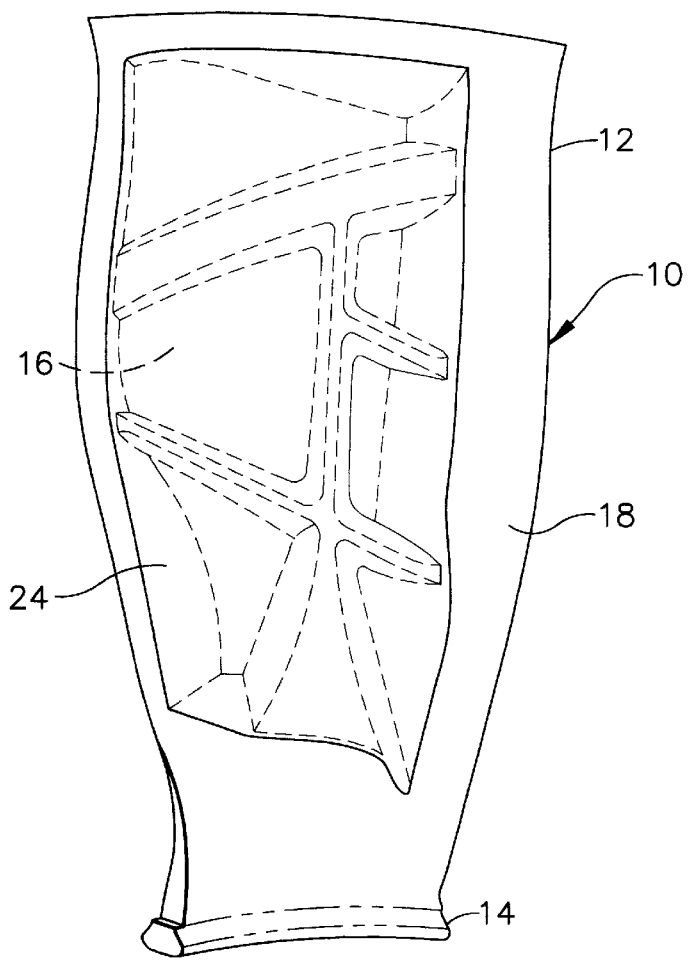
FIG. 4 is, an isometric view of the finished airfoil including cured elastomer in the several pockets thereof.

Upon removal of the caul 22 and final curing of the elastomer, the resulting blade 10 enjoys a smooth aerodynamic profile as illustrated in FIG. 4. The cured elastomer 24 fills all of the pockets 16 and is bonded thereto flush to the airfoil first side 18 for completing the aerodynamic contour thereof. The caul 22 may be reused to manufacture subsequent fan blades in series production.

Hybrid airfoils including metal bodies with elastomeric pockets may be readily formed at significantly reduced cost using the injection process according to the present invention. The process may also be used for other types of hybrid airfoils in a gas turbine engine such as stator vanes or outlet guide vanes.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A method of making a hybrid gas turbine engine airfoil comprising:

forming a metal airfoil with a pocket in a first side thereof;

covering said pocket with a caul;

injecting an elastomeric fluid into said pocket; and curing said fluid in said pocket for bonding thereto.

2. A method according to claim 1 wherein:

said airfoil first side has a varying contour; and said caul is registered with said airfoil to match said varying contour of said airfoil first side.

3. A method according to claim 2 further comprising:

sealing said caul to said airfoil atop said pocket;

injecting said fluid under pressure into said pocket; and bleeding air from said pocket as said fluid displaces said air in said pocket.

4. A method according to claim 3 wherein:

said airfoil is formed with a plurality of pockets in said first side thereof; and said fluid is injected in turn into said pockets.

5. A method according to claim 4 wherein:

said airfoil is formed with ribs between adjacent ones of said pockets;

said caul is contoured to provide a gap atop said ribs; and said fluid is injected in one of said pockets to flow through said gap to fill an adjoining one of said pockets.

6. A method according to claim 5 wherein said fluid is injected through said caul at a single site and fills all said pockets in turn.

7. A method according to claim 3 wherein said pressure of said fluid is maintained after said pocket is filled therewith until said fluid is cured.

8. A method according to claim 3 wherein said fluid is injected at one end of said caul, and said air is bled at an opposite end of said caul.

9. A method according to claim 3 further comprising limiting back pressure of said fluid in said pocket to limit distortion of said caul.

10. A method of making a hybrid airfoil comprising:

forming a metal airfoil with a plurality of adjoining pockets in a first side thereof;

covering said pockets with a caul;

injecting an elastomeric fluid in turn into said pockets; and curing said fluid in said pockets for bonding thereto.

11. A method according to claim 10 further comprising:

sealing said caul to said airfoil atop said pockets;

injecting said fluid under pressure into said pockets; and bleeding air from said pockets as said fluid displaces said air in said pockets.

12. A method according to claim 11 wherein:

said airfoil first side has a varying contour; and said caul is registered with said airfoil to match said varying contour of said airfoil first side.

13. A method according to claim 12 wherein:

said airfoil is formed with recessed ribs between adjacent ones of said pockets;

said caul is contoured to provide a gap atop said ribs; and said fluid is injected in one of said pockets to flow through said gap to fill an adjoining one of said pockets.

14. A method according to claim 13 wherein said fluid is injected through said caul at a single site at one end of said caul, and fills all said pockets in turn as said air is bled at an opposite end of said caul.

15. A method according to claim 14 further comprising limiting back pressure of said fluid in said pockets to limit distortion of said caul.

16. A method according to claim 15 wherein said caul has a contour complementary with said varying contour of said airfoil first side, and is clamped in engagement therewith.

17. A method according to claim 2 wherein said caul has a contour complementary with said varying contour of said airfoil first side, and is clamped in engagement therewith.

\* \* \* \* \*